US010528720B1

United States Patent
Matsuura et al.

(10) Patent No.: US 10,528,720 B1
(45) Date of Patent: Jan. 7, 2020

(54) AUTOMATED SCRIPT

(71) Applicant: Vivint, Inc., Provo, UT (US)

(72) Inventors: Craig Matsuura, Draper, UT (US);
Ryan Carlson, South Jordan, UT (US);
Johny Bui, South Jordan, UT (US);
John Rigby, Lehi, UT (US); Bruce Vernon, Cottonwood, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/391,051

(22) Filed: Apr. 22, 2019

Related U.S. Application Data

(63) Continuation of application No. 15/258,539, filed on Sep. 7, 2016, now Pat. No. 10,268,818.

(51) Int. Cl.
| | | |
|---|---|---|
| *G06F 21/00* | (2013.01) | |
| *G06F 21/51* | (2013.01) | |
| *G06F 21/62* | (2013.01) | |
| *G06F 21/60* | (2013.01) | |
| *G06F 21/44* | (2013.01) | |

(52) U.S. Cl.
CPC .............. *G06F 21/51* (2013.01); *G06F 21/44* (2013.01); *G06F 21/604* (2013.01); *G06F 21/62* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,590,597 B1 | 7/2003 | Kim | |
| 6,757,837 B1 * | 6/2004 | Platt | G06F 11/0748 714/38.13 |
| 7,089,066 B2 | 8/2006 | Hesse et al. | |
| 7,966,083 B2 | 6/2011 | Moorer et al. | |
| 8,838,931 B1 | 9/2014 | Marshak et al. | |
| 2004/0117310 A1 | 6/2004 | Mendez et al. | |
| 2005/0154553 A1 | 7/2005 | Wheeler et al. | |
| 2010/0151926 A1 * | 6/2010 | Ruppert | G06F 8/60 463/1 |
| 2012/0221622 A1 | 8/2012 | Raju et al. | |
| 2013/0007724 A1 | 1/2013 | Lai et al. | |
| 2014/0002236 A1 * | 1/2014 | Pineau | G06F 21/32 340/5.6 |
| 2015/0331784 A1 | 11/2015 | Nanjundappa et al. | |
| 2017/0078096 A1 | 3/2017 | Prabu et al. | |

* cited by examiner

*Primary Examiner* — Andrew J Steinle
(74) *Attorney, Agent, or Firm* — Holland & Hart LLP

(57) ABSTRACT

A device may require one or more updates to its software. However, the device may be inaccessible due to a variety of circumstances. Troubleshooting the device may be difficult. Therefore, the device may be configured to automatically run a script after it has been validated to perform one or more functions on the control panel. In one embodiment, a method to automate a script on a device is described. The method may include searching an attached external storage device for a script, identifying a script based at least in part on the searching, validating the authenticity of the identified script, and executing, automatically, the validated script.

20 Claims, 12 Drawing Sheets

AUTOMATED SCRIPT

CROSS-REFERENCE TO RELATED APPLICATION

The present application is a continuation of U.S. patent application Ser. No. 15/258,539, filed Sep. 7, 2016, titled "AUTOMATED SCRIPT" and assigned to the assignee hereof, the disclosure of which is incorporated herein in its entirety by this reference.

BACKGROUND

The present disclosure, for example, relates to security and/or automation systems, and more particularly to automated script execution.

Security and automation systems are widely deployed to provide various types of communication and functional features such as monitoring, communication, notification, and/or others. These systems may be capable of supporting communication with a user through a communication connection or a system management action.

In some instances, a device may require one or more scripts to be run. The scripts may perform one or more functions. Typically, the scripts may require user input to properly execute and perform the appropriate functions. However, user input to run the script may be cumbersome and not possible.

SUMMARY

At times, a device may require one or more software updates. However, the device may be inaccessible due to a variety of circumstances. Troubleshooting the device may be difficult. Therefore, the device may be configured to automatically run a script after it has been validated to perform one or more functions on a control panel of a home security and/or home automation system.

In one embodiment, a method to automate a script on a device is described. The method may comprise searching an attached external storage device for a script, identifying a script based at least in part on the searching, validating the authenticity of the identified script, and executing, automatically, the validated script.

In some instances, the method may include identifying when an external storage device connects to the device. The device may be a control panel of an automation system. The control panel may be updated based at least in part on automatically executing the validated script. Updating the control panel may include reformatting the control panel.

In some embodiments, executing the script may comprise troubleshooting one or more software issues. The method may include sending the attached external storage device a validating request and receiving a response to the validating request, wherein the response authenticates the external storage device and the script. The external storage device and script may automatically run on multiple devices. In some instances, the external storage device may unlock the device prior to running the validated script.

The device may be a control panel and the script may be only accessible on one or more external storage devices authenticated by an automation system provider associated with the control panel. Results of the executed script may be reported to the automation system provider. In some instances, the method may include detecting a digital signature embedded in the identified script.

In another embodiments, a device is described. The device may comprise a processor, memory in electronic communication with the processor, and instructions stored in the memory. The instructions may be executable by the processor to search an attached external storage device for a script, identify a script based at least in part on the searching, validate the authenticity of the identified script, and execute, automatically, the validated script.

In a further embodiment, a non-transitory computer-readable medium storing computer-executable code for security and/or automation systems is disclosed. The code may be executable by a processor to search an attached external storage device for a script, identify a script based at least in part on the searching, validate the authenticity of the identified script, and execute, automatically, the validated script.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
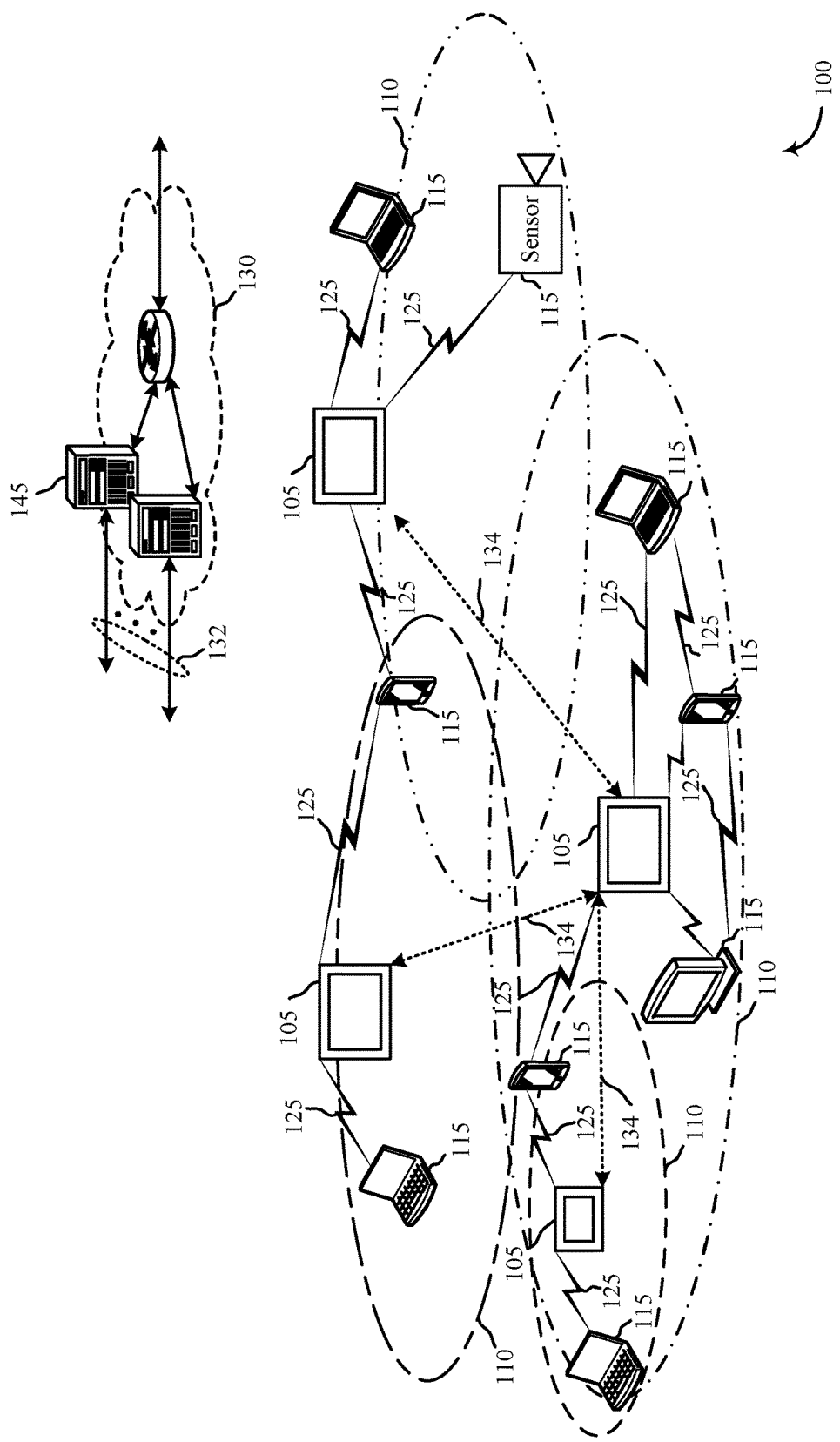
FIG. 1 shows a block diagram relating to a security and/or an automation system, in accordance with various aspects of this disclosure.

Security and/or automation systems often include a control panel. The control panel may be used as an interface to control various devices, sensors, etc. of the security and/or automation systems. A control panel may prevent access to one or more aspects of the control panel based at least in part on one or more security parameters. The security parameters may include a default locked status and a takeover locked status. The default locked status may prevent a user or other personnel from accessing the software, code, or other intellectual property on the control panel while still allowing the user to interface with the security and/or automation system. The takeover locked status may prevent any access or use of the control panel. To protect the automation system and the automation system provider, it may be desired to use a unique identifier to unlock at least one or more aspects of the control panel. The unique identifier may be loaded onto an external storage device which the control panel may automatically recognize.

In one embodiment, a method to unlock a device is described. The method may comprise generating a unique identifier and transmitting the unique identifier to a location remote from the device. The method may include locking at least one aspect of the device based at least in part on one or more security parameters and unlocking at least one aspect the device when the unique identifier is input into the device.

In some embodiments, one or more aspects of the control panel may be locked. For example, the software, code, and other workings of the control panel may be blocked from access without authentication. Additionally, the entire control panel may be locked and in a takeover locked state. Once the control panel is unlocked, the control panel may need servicing, updating, changes, alterations, or the like. The alterations to the control panel may comprise updating the panel and/or troubleshooting one or more potential problems or issues with the control panel. For example, the control panel may not be performing correctly and/or may be malfunctioning. The script may allow a service provider to debug the control panel.

While the description describes automatically executing a script stored on an external storage device for a control panel of a security and/or automation system, it is to be understood that the present systems and methods may be implemented for any type of device that is capable of connecting (e.g., wired or wirelessly) to an external storage device.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a communications system 100 in accordance with various aspects of the disclosure. The communications system 100 may include control panels 105, devices 115, and/or a network 130. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 and may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 are dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a sensor, a security camera, a universal serial bus (USB) external storage device, and/or the like. A device 115 may also include or be referred to by those skilled in the art as a user device, a sensor, an external storage device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, an external storage device, and/or some other suitable terminology. A device 115 may include and/or be one or more sensors that sense: proximity, motion, temperatures, humidity, sound level, smoke, structural features (e.g., glass breaking, window position, door position), time, geo-location data of a user and/or a device, distance, biometrics, weight, speed, height, size, preferences, light, darkness, weather, time, system performance, and/or other inputs that relate to a security and/or an automation system. The device 115 may be a camera used to detect and record motion. A device 115 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, Bluetooth, cellular, Z Wave, 802.11, peer-to-peer, LAN, WLAN, Ethernet, fire wire, fiber optic, and/or other connection types related to security and/or automation systems.

In some embodiments of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 125. Two or more devices 115 may communicate via a direct communication link 125 when both devices 115 are in the geographic coverage area 110 or when one or neither devices 115 is within the geographic coverage area 110. Examples of direct communication links 125 may include Wi-Fi Direct, Bluetooth, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, the control panel 105 may communicate one or more unique identifiers to a remote server 145 and/or storage device through one or more communication links 132. The remote server 145 and/or storage device may retain the unique identifier. The control panel 105 may lock in response to one or more security parameters. The security parameters may include a hostile takeover of the control panel 105, an unauthorized attempt to reformat or reconfigure the control panel 105 by altering the software, hardware or both, and the like. The control panel 105 may communicate its locked status to the remote server 145 via the communication links 132. An external storage device 115 may then retrieve the unique identifier from the remote server 145 and directly connect to the control panel 105 to unlock the control panel 105. This may be performed by authorized personnel associated with an automation system provider.

In further embodiments, the control panel 105 may be malfunctioning, either due to a hostile takeover, or some other event. The control panel 105 may recognize when an external storage device 115 connects to the control panel 105. The external storage device 115 may comprise a script which may run one or more diagnostic tests on the control panel 105 to determine malfunctioning software. In other instances, the script may update the control panel 105, update the operating system or software components of the control panel 105, and the like. The control panel 105 may automatically run the script.

Figure 2:
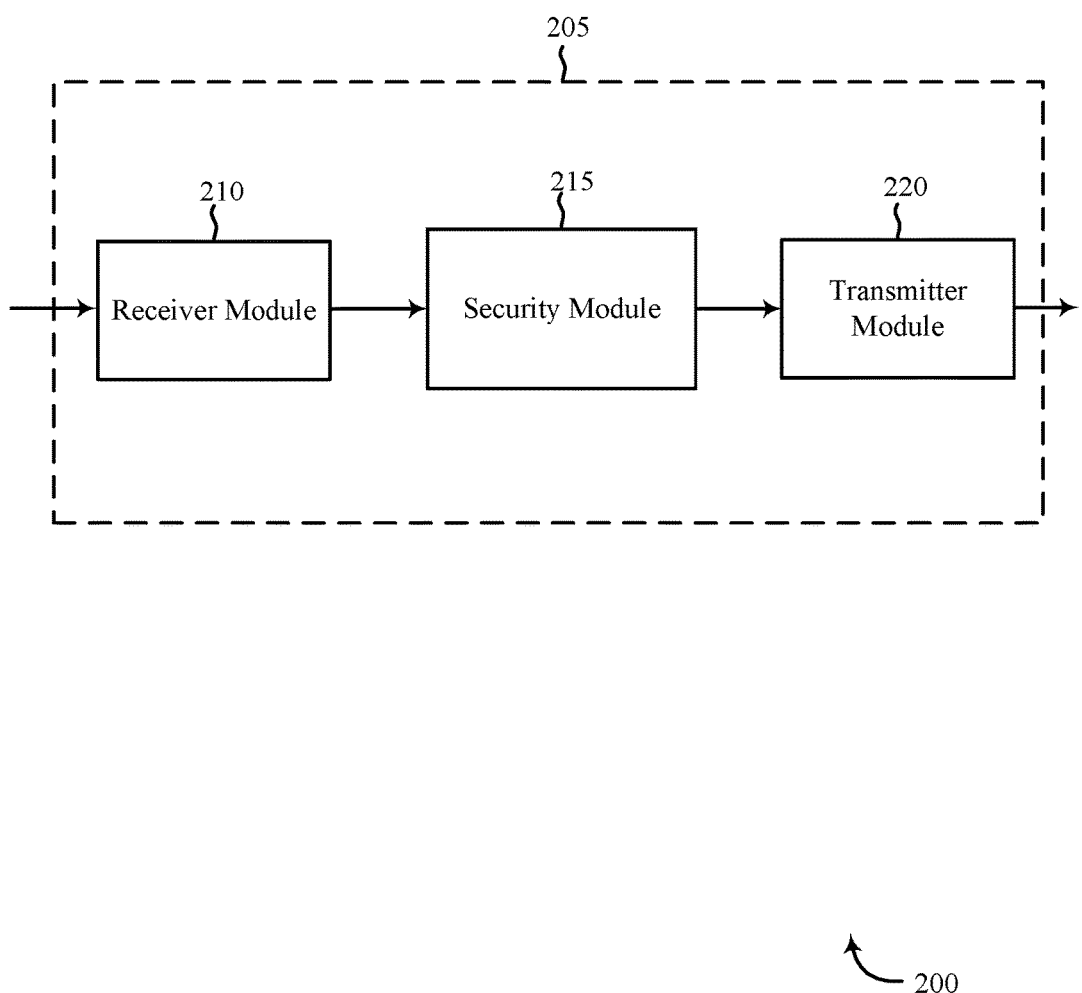
FIG. 2 shows a block diagram of a device relating to a security and/or an automation system, in accordance with various aspects of this disclosure.

FIG. 2 shows a block diagram 200 of a control panel 205 for use in security reactions, in accordance with various aspects of this disclosure. The control panel 205 may be an example of one or more aspects of a control panel 105 described with reference to FIG. 1. The control panel 205 may include a receiver module 210, a security module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more inputs of attempted tampering or altering of the control panel 205 and/or one or more inputs of potentially harmful software. Information may be passed on to the security module 215, and to other components of the control panel 205.

The security module 215 may protect one or more portions of the control panel 205. The security module 215 may have a default locked status of the control 205. The default locked status may protect the software, code, and other internal embodiments of the control panel 205. This may prevent the user from tampering with the control panel 205. It may also prevent a competitor from gaining access to the software and/or code. The default locked status may allow a user to operate the control panel and interface with a security and/or automation system without comprising the control panel or the intellectual property included within the control panel. The security module 215 may additionally respond to tampering or potentially harmful software by entering the control panel 205 into a takeover locked state. In a takeover locked state, the control panel 205 may be inaccessible by the user or any other personnel.

To unlock the control panel 205 from a takeover locked state or to access the default locked state of the control panel 205, a specific code may be necessary. The specific code may be a numeric code, an alpha code, an alphanumeric code, a series of codes, or some combination thereof. The code may be generated by the security module 215 and stored at a location remote to the control panel 205. The security module 215 may then respond to an event by locking the control panel 205. The event may comprise personnel servicing the control panel 205 and/or a security event. The security module 215 may only unlock the control panel 205 and allow any personnel access once the security module 215 recognizes the code in an attached device.

The transmitter module 220 may transmit the one or more signals received from other components of the control panel 205. The transmitter module 220 may transmit the security code to one or more locations remote from the control panel 205. The transmitter module 220 may additionally transmit one or more alerts of a locked control panel 205 to a remote server or other venue associated with the automation system. In some examples the transmitter module 220 may be collocated with the receiver module 210 in a transceiver module.

Figure 3:
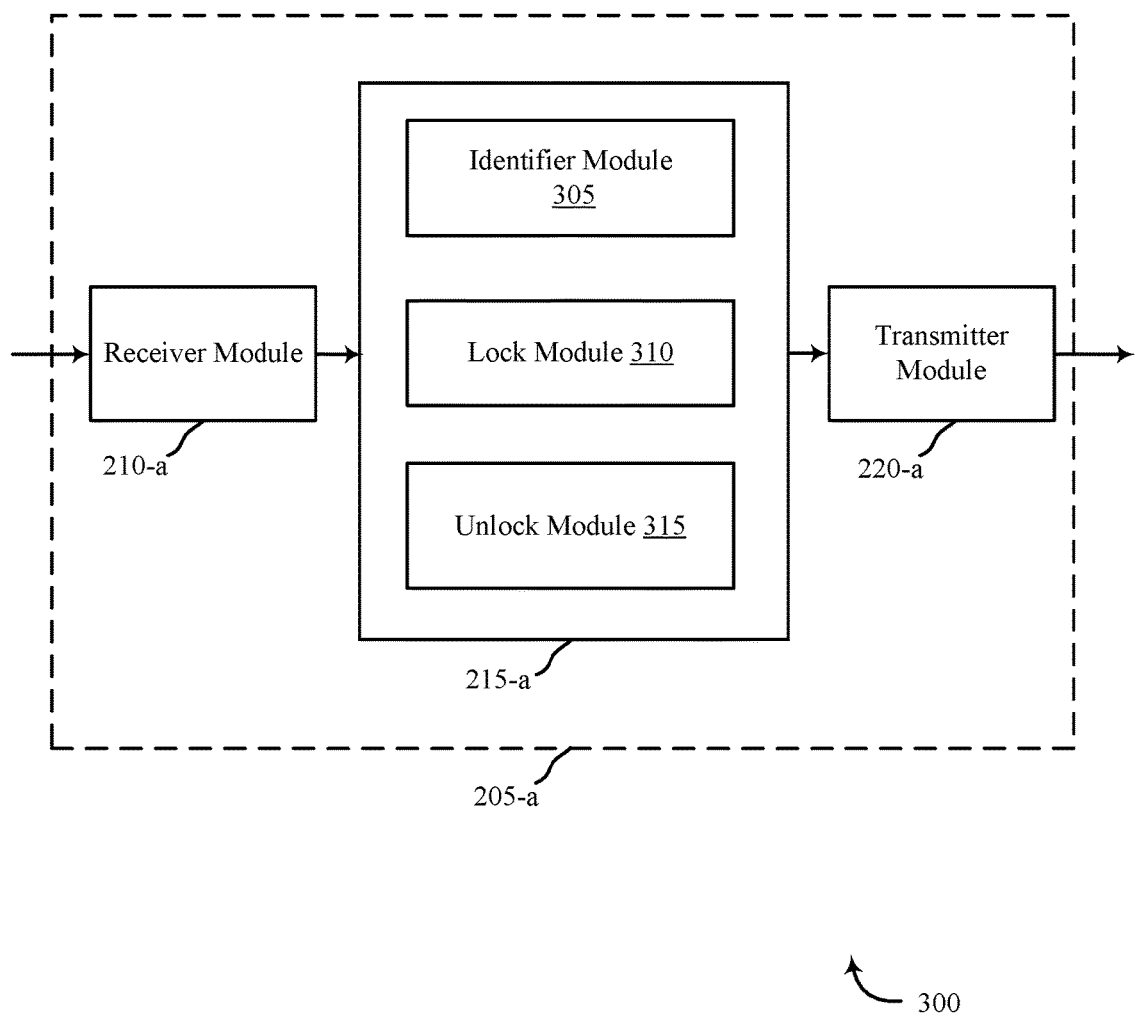
FIG. 3 shows a block diagram of a device relating to a security and/or an automation system, in accordance with various aspects of this disclosure.

FIG. 3 shows a block diagram 300 of a control panel 205-a for use in security systems, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, a security module 215-a, and/or a transmitter module 220-a, which may be examples of the corresponding modules of control panel 205 with reference to FIG. 2. The control panel 205-a may also include a processor. Each of these components may be in communication with each other. The security module 215-a may include an identifier module 305, a lock module 310, and an unlock module 315. The receiver module 210-a and the transmitter module 220-a may perform the functions of the receiver module 210 and the transmitter module 220, of FIG. 2, respectively.

The identifier module 305 may generate one or more unique identifiers to securely access the control panel 205-a. The unique identifier may be one of several types of identifiers. For example, the unique identifier may be a biometric identifier responding to a person's voice or fingerprint, it may be a randomly generated number of a predetermined length, it may be a series of codes to be input in a specific manner, it may be an alphanumeric number, or the like.

In some embodiments, the unique identifier may be unique to the control panel 205-a. For example, each control panel 205-a may generate a unique identifier which it may transfer to a server associated with the automation system. In some embodiments, the unique identifier may be generated when the control panel 205-a is first programmed. In other embodiments, the unique identifier may additionally or alternatively be generated on a random or predetermined basis. For example, every month, bi-monthly, bi-annually, or annually, the unique identifier may be regenerated. In some embodiments, regenerating the unique identifier may offer additional security to prevent unauthorized access or tampering with the control panel 205-a.

In some embodiments, the unique identifier may allow a user to select the level of access to the control panel 205-a or other device. The unique identifier may be linked to one or more profiles on a control panel 205-a. Varying levels of access may be granted for each profile. Generating different identifiers for different profiles may ensure the correct personal unlocks the control panel 205-a with the appropriate access level.

The lock module 310 may maintain two different locked states. The lock module 310 may maintain a default locked status and a takeover locked statues. The default locked status may prevent a user or other personnel from accessing the software and/or code and other intellectual property associated with the control panel 205-a while still allowing the user to interface with and control the security and/or automation system. The lock module 310 may maintain the default locked status and disallow any attempts to access the software.

If there is an attempt to view, access, or alter the software and/or code, the lock module 310 may enter a takeover locked status. In the takeover locked status, the user may be unable to access any portion of the control panel 205-a. The lock module 310 may lock all aspects of the control panel 205-a in response to one or more security events. For example, if a user or other personnel attempt to access and reprogram the control panel 205-a, the control panel 205-a may default and enter a takeover lock status preventing access to the system. In some instances, this may occur when a competitor attempts to overtake the system. It may also occur if a user is attempting to further program the control panel 205-a to change an aspect of the automation system. In another instance, a person may gain unauthorized access to the automation system and may attempt to override or otherwise hack into the control panel 205-a to gain unauthorized access to at least a portion of the automation system. Additionally, the lock module 310 may automatically enter the default and/or takeover locked status when the control panel 205-a is reformatted.

The unlock module 315 may allow authorized personnel with access to the security code to unlock the control panel 205-a from either the default locked state or the takeover locked state and allow one or more personnel to unlock and access the functions of the control panel 205-a. The unlock module 315 may recognize the unique identifier as it is entered into one or more tactile inputs on the control panel 205-a. In other embodiments, the control panel 205-a may be situated to receive input from a secondary device or an external storage device 115, such as one of the devices 115 described with reference to FIG. 1. For example, the control panel 205-a may have one or more input capabilities. The input capabilities may comprise a universal serial bus (USB) drive, a high definition multi-media interface (HDMI) input, thunderbolt input, firewire, Ethernet, or other wired inputs. The wired inputs may accept a wire which may connect the control panel 205-a to an external device 115 that is able to connect to one or more of these input capabilities of the control panel 205-a. The unlock module 315 may automatically read information on the external device connected to the control panel 205-a. In some embodiments, the control panel 205-a may uniquely read the unique identifier stored on the external device.

The unlock module 315 may allow the control panel 205-a to completely unlock and allow personnel to access the software and/or code and other intellectual property internal to the control panel 205-a. In another embodiment, the unlock module 315 may unlock the takeover locked mode and allow a user to access the normal functions of the control panel 205-a.

Figure 4:
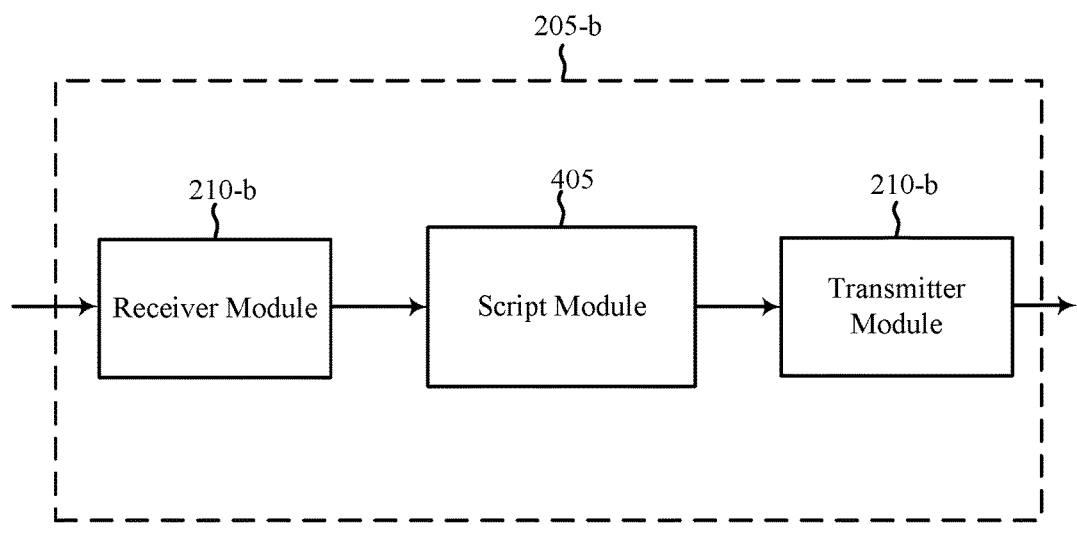
FIG. 4 shows a block diagram of a device relating to a security and/or an automation system, in accordance with various aspects of this disclosure.

FIG. 4 shows a block diagram 400 of a control panel 205-b for use in script automation, in accordance with various aspects of this disclosure. The control panel 205-b may be an example of one or more aspects of a control panel 105 and 205 described with reference to FIGS. 1, 2, and/or 3. The control panel 205-b may include a receiver module 210-b, a script module 405, and/or a transmitter module 220-b. The control panel 205-b may also be or include a processor. Each of these modules may be in communication with each other—directly and/or indirectly.

The components of the control panel 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210-b and the transmitter module 220-b may perform the functions of the receiver module 210 and the transmitter module 220, respectively, of FIGS. 2 and/or 3.

The script module 405 may identify when an external storage device 115 is connected to the control panel 205-b. The script module 405 may validate the external storage device 115 and then search the device 115 for one or more scripts. In some embodiments, validating the external storage device 115 may be completed by the security module 215. The security module 215 may communicate the validation to the script module 405. In other embodiments, the script module 405 may independently verify and validate the external storage device 115. After the external storage device 115 is validated, the script module 405 may automatically execute the script stored on the device 115. When executed, the script may update and correct code, update the control panel 205-b, debug the control panel 205-b, and the like.

As previously explained, the transmitter module 220-b may transmit one or more signals received from other components of the control panel 205-b. The transmitter module 220-b may transmit one or more pieces of information to a remote server 145. The information may comprise a status of the script, any results from the script, any potential issues uncovered, and the like. If the control panel 205-b was locked, the transmitter module 220-b may additionally transmit one or more alerts of an unlocked state of the control panel 205-b to a remote server 145 or other venue associated with the automation system. In some examples the transmitter module 220-b may be collocated with the receiver module 210-b in a transceiver module.

Figure 5:
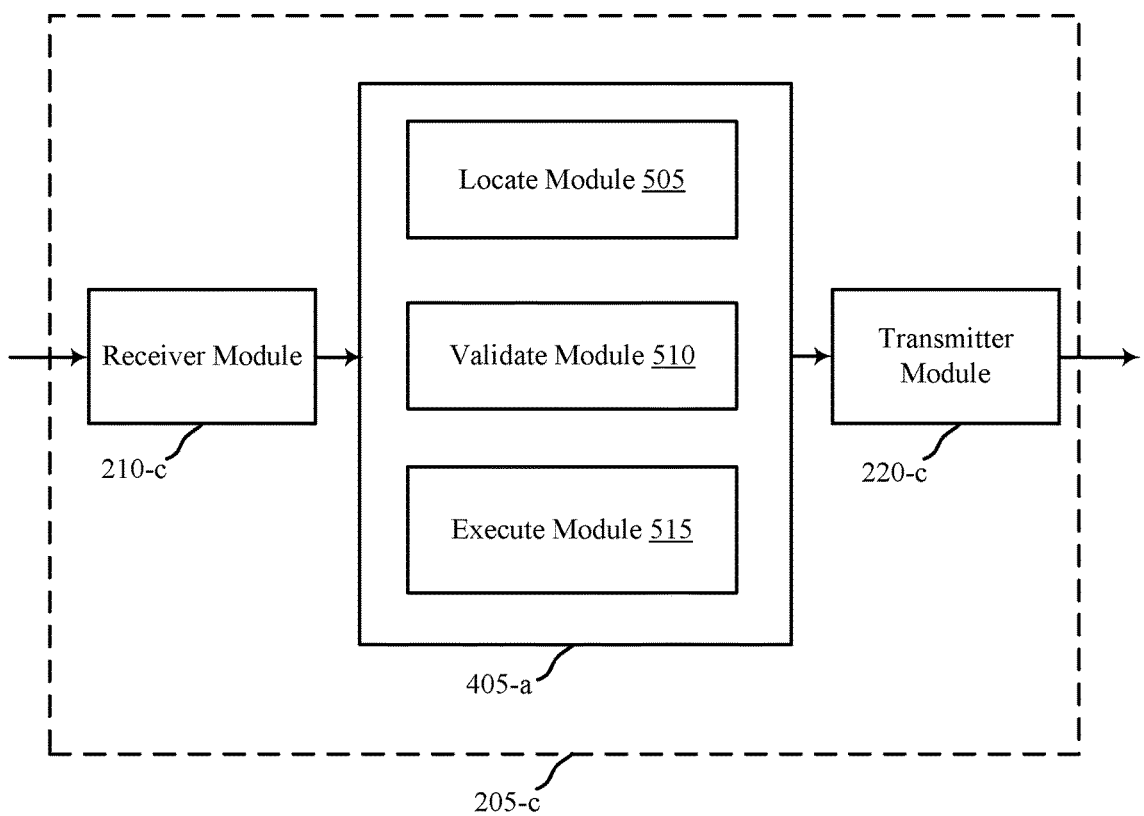
FIG. 5 shows a block diagram of a device relating to a security and/or an automation system, in accordance with various aspects of this disclosure.

FIG. 5 shows a block diagram 500 of a control panel 205-c for use in security systems, in accordance with various examples. The control panel 205-c may be an example of one or more aspects of a control panel 105 and/or 205 described with reference to FIGS. 1, 2, 3, and/or 4. The control panel 205-c may include a receiver module 210-c, a script module 405-a, and/or a transmitter module 220-c, which may be examples of the corresponding modules of control panel 205 described with reference to FIGS. 1, 2, 3, and/or 4. The control panel 205-c may also include a processor. Each of these components may be in communication with each other. The script module 405-a may include a locate module 505, a validate module 510, and an execute module 515. The receiver module 210-c and the transmitter module 220-c may perform the functions of the receiver module 210 and the transmitter module 220, respectively, of FIGS. 2, 3, and/or 4.

The locate module 505 may determine when an external storage device 115 is connected to the device, search the attached external storage device for a script, and identify a script based at least in part on the searching. A control panel will be used as an exemplary device in the forgoing description but any device may be used. The control panel 205-c may have one or more input capabilities. The input capabilities may comprise a universal serial bus (USB) drive, a high definition multi-media interface (HDMI) input, thunderbolt input, firewire, Ethernet, or other wired inputs. An external storage device 115, such as one of the devices 115 described with reference to FIG. 1, may use the wired inputs to connect to the control panel 205-c. The external storage device 115 may be any external storage device such as a laptop, USB drive, a tape deck, or the like.

The locate module 505 may determine when an external storage device 115 is connected to the control panel 205-c. For example, once connected, the external storage device 115 may complete a circuit internal to the control panel 205-c. Once the circuit is completed, the control panel 205-c may be prompted to determine identifying characteristics of the external storage device 115. For example, the locate module 505 may search the external storage device 115 for a script. The script may have identifying characteristics that alert the control panel 205-c. An example of the script may comprise:

BEGIN PGP SIGNED MESSAGE
Hash: SHA1
!/bin/sh
if [$(fw_printenv bootnum)="bootnum=1"]
then
echo "changing bootnum from 1 to 2"
fw_setenv bootnum 2
else
echo "changing bootnum from 2 to 1"
fw_setenv bootnum 1
fi
echo "current bootnum is" $(fw_printenv bootnum)
Vivint Sky Approved 4C5302027103111191 20run_mfg_test.sh ###
Vivint Sky Approved 4C5302027103111191 20run_mfg_test.sh ###
BEGIN PGP SIGNATURE
Version: GnuPG v 1
iQEcBAEBAgAGBQJT82iTAAoJENB+
5n56BNFGkPgH/itVzoZX6kGjFbc8e8N8j5Me
wKjdIs1DNw8s7cfh0auIE7XdyB9zXkdms7zp8
CHnZ+fjOjVJFHrWHn2WmwHS2qX5SfB2rtxTA/
M2fP7PKTwRxQo6Ne2vptyAPUqr/
5RSwjsa7PrEGUt7sSuE3JwB7Ywe pb891U/Cp3
W/oy40F4DZmjzCAaYGmx191fYb3mGmuim1PK/
XPlkbixGUqAO7Vs6S 7pSQYqAeyLgqZf3V+
oUB86zXAo7DgqtZf28FAQjDgcGaP5czgdOY5WV
KBWM8KaOD GbidE3LvgoYCo94BrvIab9xwK5y/
cw4GfFJpP1Hw3fHdAsDxAo9QjfR1r8GuOKU==Txjj
END PGP SIGNATURE
The locate module 505 may be programmed to automatically read information on the external storage device 115 connected to the control panel 205-c. Once the script is identified, the script may be validated. Additionally, the external storage device 115 may be validated before, after, or during the script search.

The validate module 510 may validate the external storage device 115, the script, or some combination thereof. The validate module 510 may authenticate both the external storage device 115 and the script separately. In other embodiments, when the locate module 505 identifies the external device 115 and locates the script, the validate module 510 may validate the script and the external device 115 in combination. The validate module 510 may send a challenge question or validating request to the external storage device 115 which may respond with an authenticating response. The validate module 510 may also determine the presence of a digital signature or other embedded file proving the source of the external device 115 and/or script. The digital signature may comprise a mathematical scheme which may demonstrate the authenticity of the external storage device 115 and/or the script.

The execute module 515 may automatically execute one or more validated scripts. For example, the execute module 515 may run the script with no outside input from personnel. The script may have several uses. If there is a latent bug or other adverse coding of the control panel 205-c, the script may automatically update and correct the code. The script may also run an update on the control panel 205-c itself. For example, the control panel 205-c may require a new operating system. Debugging the control panel 205-c may allow a service personnel to access the internal workings of the control panel 205-c without the need for a highly trained individual to sort through lines of codes and attempt to debug the control panel 205-c. The script may additionally test different aspects of the coding and determine where a discrepancy may be located, if at all.

Once the execute module 515 runs the script automatically, the execute module 515 may report any results. The results may be reported to a provider of the automation system or may be a read out on a user interface on the control panel 205-c. In some instances, the results of the script may cause the execute module 515 to run multiple scripts, all of which may be performed automatically without any user input.

Figure 6:
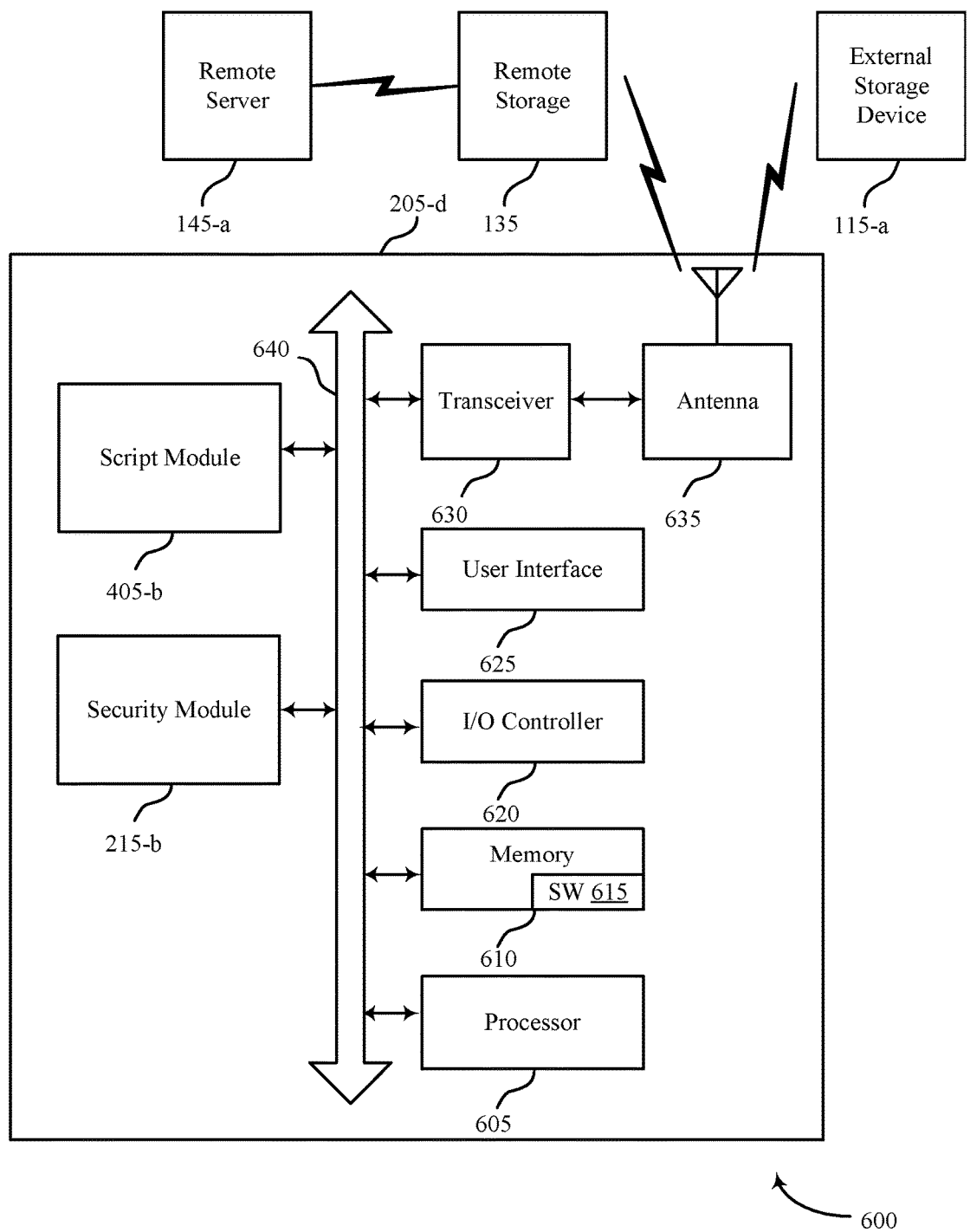
FIG. 6 shows a block diagram relating to a security and/or an automation system, in accordance with various aspects of this disclosure.

FIG. 6 shows a system 600 for use in unlocking a control panel 205-d for use in a security and automation system, in accordance with various examples. System 600 may include a control panel 205-d, which may be an example of the control panels 105 and 205 of FIGS. 1, 2, 3, 4, and/or 5. The control panel 205-d may include a security module 215-b, which may be an example of the security module 215 described with reference to FIGS. 2 and 3. The control panel 205-d may additionally include a script module 405-b, which may be an example of the script module 405 described with reference to FIGS. 4 and 5. In some embodiments, the terms control panel, control device, and device are used synonymously.

The control panel 205-d may also include components for bi-directional voice and data communications including components for transmitting communications and components for receiving communications. For example control panel 205-d may communicate bi-directionally with one or more of an external storage device 115-a, remote storage 135, and/or remote server 145-a, which may be an example of the remote server 145-a illustrated in FIG. 1. This bi-directional communication may be direct (e.g., control panel 205-d communicating directly with remote storage 135) or indirect (e.g., control panel 205-d communicating indirectly with remote server 145-a through remote storage 135).

The security module 215-b may generate a unique identifier, maintain a default locked status, completely lock the control panel 205-d in response to one or more unauthorized events, and unlock at least a portion of the control panel 205-d with the use of the unique identifier based at least in part on one or more security parameters as described above with reference to FIGS. 2 and 3. For example, the security module 215-b may detect an unauthorized breach of the control panel 205-d or an error in a piece of code or equipment in the control panel 205-d. In response, the security module 215-b may completely lock the control panel 205-d preventing the use of the automation system. The security module 215-a may additionally recognize when authorized personnel are attempting to service portions of the control panel 205-c. The security module 215-a may allow the authorized personnel access to all aspects of the control panel 205-c including those associated with the default locked status.

The script module 405-b may automatically execute, or run, one or more scripts on the control panel 205-d based at least in part on one or more execution parameters as described above with reference to FIGS. 4 and 5. For example, the script module 405-b may update or debug one or more issues present with the control panel. The automated script may be run without personnel and may allow personnel to quickly update the control panel.

The control panel 205-d may also include a processor module 605, and memory 610 (including software (SW) 615), an input/output controller module 620, a user interface module 625, a transceiver module 630, and one or more antennas 635 each of which may communicate—directly or indirectly—with one another (e.g., via one or more buses 640). The transceiver module 630 may communicate bi-directionally—via the one or more antennas 635, wired links, and/or wireless links—with one or more networks or remote devices as described above. For example, the transceiver module 630 may communicate bi-directionally with one or more of an external storage device 115-a, remote storage 135, and/or remote server 145-a. The transceiver module 630 may include a modem to modulate the packets and provide the modulated packets to the one or more antennas 635 for transmission, and to demodulate packets received from the one or more antenna 635. While a control panel or a control device (e.g., 205-d) may include a single antenna 635, the control panel or the control device may also have multiple antennas 635 capable of concurrently transmitting or receiving multiple wired and/or wireless transmissions. In some embodiments, one element of control panel 205-d (e.g., one or more antennas 635, transceiver module 630, etc.) may provide a direct connection to a remote server 145-a via a direct network link to the Internet via a POP (point of presence). In some embodiments, one element of control panel 205-d (e.g., one or more antennas d35, transceiver module d30, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 635 and/or transceiver module 630 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 635 may receive signals or information specific and/or exclusive to itself. In other embodiments each antenna 635 may receive signals or information not specific nor exclusive to itself.

In some embodiments, the external storage device 115-a may connect to some element of system 600 via a network using one or more wired and/or wireless connections.

In some embodiments, the user interface module 625 may include an audio device, such as an external speaker system, an external display device such as a display screen, and/or an input device (e.g., remote control device interfaced with the user interface module 625 directly and/or through I/O controller module 620). An example of a remote control device may be an external storage device 115-a that may be connected to the control panel 205-d via a universal serial bus (USB) drive, a high definition multi-media interface (HDMI) input, thunderbolt input, firewire, Ethernet, or other wired inputs.

One or more buses 640 may allow data communication between one or more elements of control panel 205-d (e.g., processor module 605, memory 610, I/O controller module 620, user interface module 625, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure (e.g., automatically executing one or more scripts at the control panel 205-d in response to one or more security events, unlocking one or more locked status of the control panel 205-d, etc.). Alternatively, the software/firmware code 615 may not be directly executable by the processor module 605 but may cause a computer (e.g., when compiled and executed) to perform functions described herein.

In some embodiments the processor module 605 may include, among other things, an intelligent hardware device (e.g., a central processing unit (CPU), a microcontroller, and/or an ASIC, etc.). The memory 610 can contain, among other things, the Basic Input-Output system (BIOS) which may control basic hardware and/or software operation such as the interaction with peripheral components or devices. For example, the security module 215-b and the script module 405-b to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 630, one or more antennas 635, etc.).

Many other devices and/or subsystems may be connected to one or may be included as one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily known in the art and are not discussed in detail in this application. Code to implement the present disclosure can be stored in a non-transitory computer-readable medium such as one or more of system memory 610 or other memory. The operating system provided on I/O controller module 620 may be iOS®, ANDROID®, MS-dOS®, MS-WINDOWS®, OS/2®, UNIX®, LINUX®, or another known operating system.

The transceiver module 630 may include a modem configured to modulate the packets and provide the modulated packets to the antennas 635 for transmission and/or to demodulate packets received from the antennas 635. While the control panel 205-d may include a single antenna 635, the control panel 205-d may have multiple antennas 635 capable of concurrently transmitting and/or receiving multiple wireless transmissions.

Figure 7:
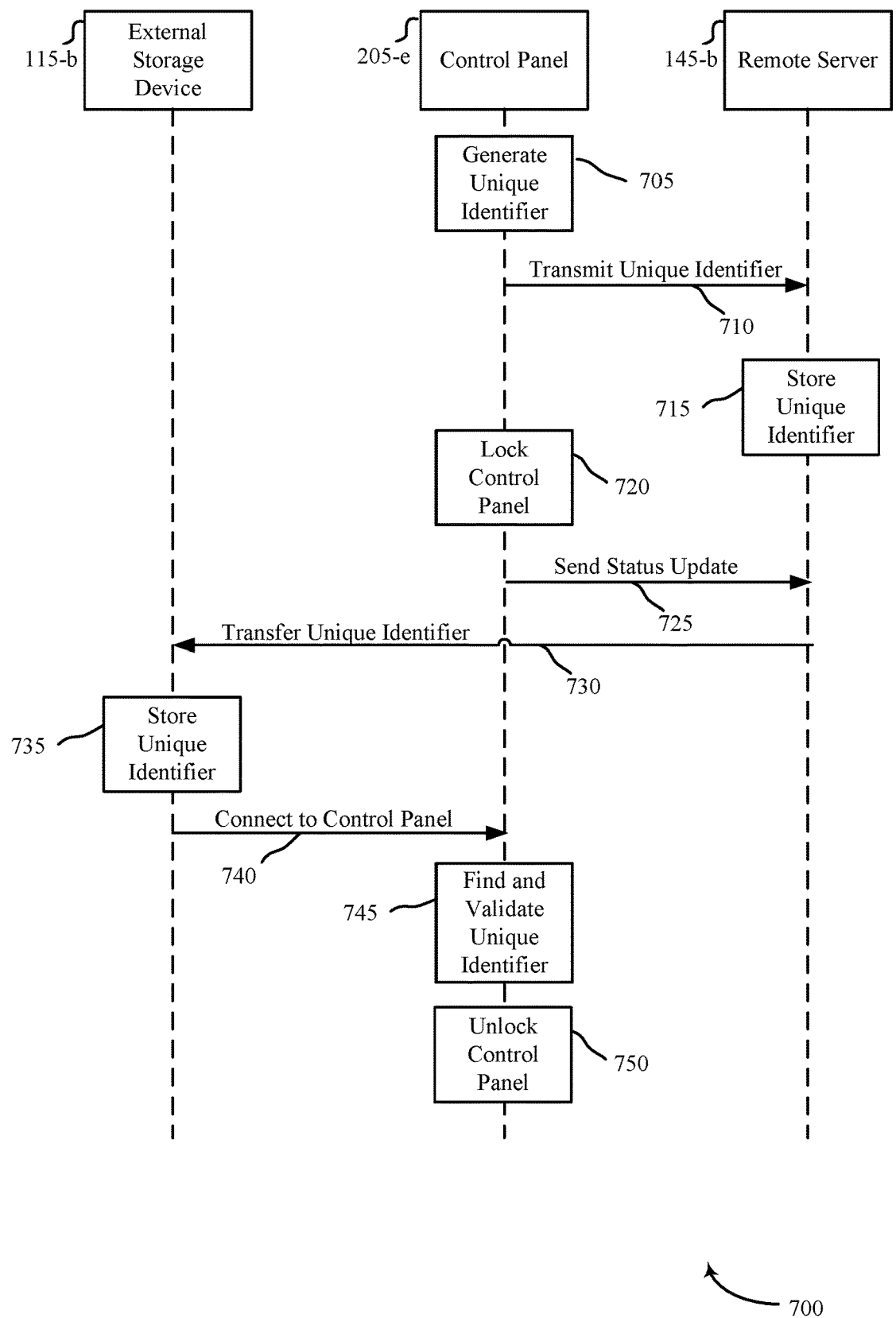
FIG. 7 shows a swim diagram of illustrating a process related to a security and/or an automation system, in accordance with various aspects of this disclosure.

FIG. 7 shows a swim diagram 700 illustrating communications in security systems for a control panel, in accordance with various examples. The diagram 700 may illustrate one or more external storage devices 115-b, which may be an example of the devices 115 of FIGS. 1 and/or 6. The diagram may also illustrate a control panel 205-e which may an example of control panels 105 and 205 of FIGS. 1, 2, 3, 4, 5, and/or 6. A remote server 145-b may be one example of the remote server 145 as described with reference to FIGS. 1 and/or 4.

The control panel 205-e may generate one or more unique identifiers 705. The unique identifiers 705 may be generated when the control panel 205-e is installed, or may be generated at predetermined times or at pseudorandom times. After the control panel 205-e generates the unique identifier 705, the control panel 205-e may transfer the unique identifier 710 to the remote server 145-b.

The remote server 145-b may store the unique identifier 715. The server 145-b may have one or more storage mediums (e.g. remote storage database) and may retain the unique identifier in that storage.

The control panel 205-e may lock 720 in response to one or more security events. The security events may comprise a bad line of code, a mis-performing software function, an attempt to reformat the control panel 205-e, an attempt to reprogram the control panel 205-e, or the like. The control panel 205—may send a status update 725 to the server 145-b. The status update may comprise one or more pieces of information relating to the security event and the locked status of the control panel 205-e.

The remote server 145-b may transfer the unique identifier 730 to an external storage device 115-b. The remote server 145-b may transfer the unique identifier 730 to the external storage device 115-b via one of several mediums. The external storage device 115-b may plug directly into the remote server 145-b via a wired connection, a USB direct connection, a wireless connection, or the like.

The external storage device 115-b may store the unique identifier 735 and then connect to the control panel 740. The external storage device 115-b may connect to the control panel 205-e via a wired connection, or may plug directly into the control panel 205-e via a USB connection, or some other means of connection.

Once the external storage device 115-b and the control panel 205-e are linked, the control panel 205-e may find and validate the unique identifier 745. For example, the external storage device 115-*b* may complete one or more circuits when it connects to the control panel 205-*e*. The control panel 205-*e* may recognize the closed circuit and search the external storage device 115-*b* for the unique identifier. Once the unique identifier is located, the control panel 205-*e* may compare the unique identifier to the latest generated unique identifier stored locally on the control panel 205-*e*. If the unique identifiers match, the control panel 205-*e* may unlock 750 one or more locked statuses. For example, the control panel 205-*e* may completely unlock and allow access to all aspects of the control panel 205-*e*. Alternatively, the control panel 205-*e* may unlock from a takeover locked status to a default locked status wherein the user may once again use the control panel 205-*e* to interface with the security and/or automation system.

Figure 8:
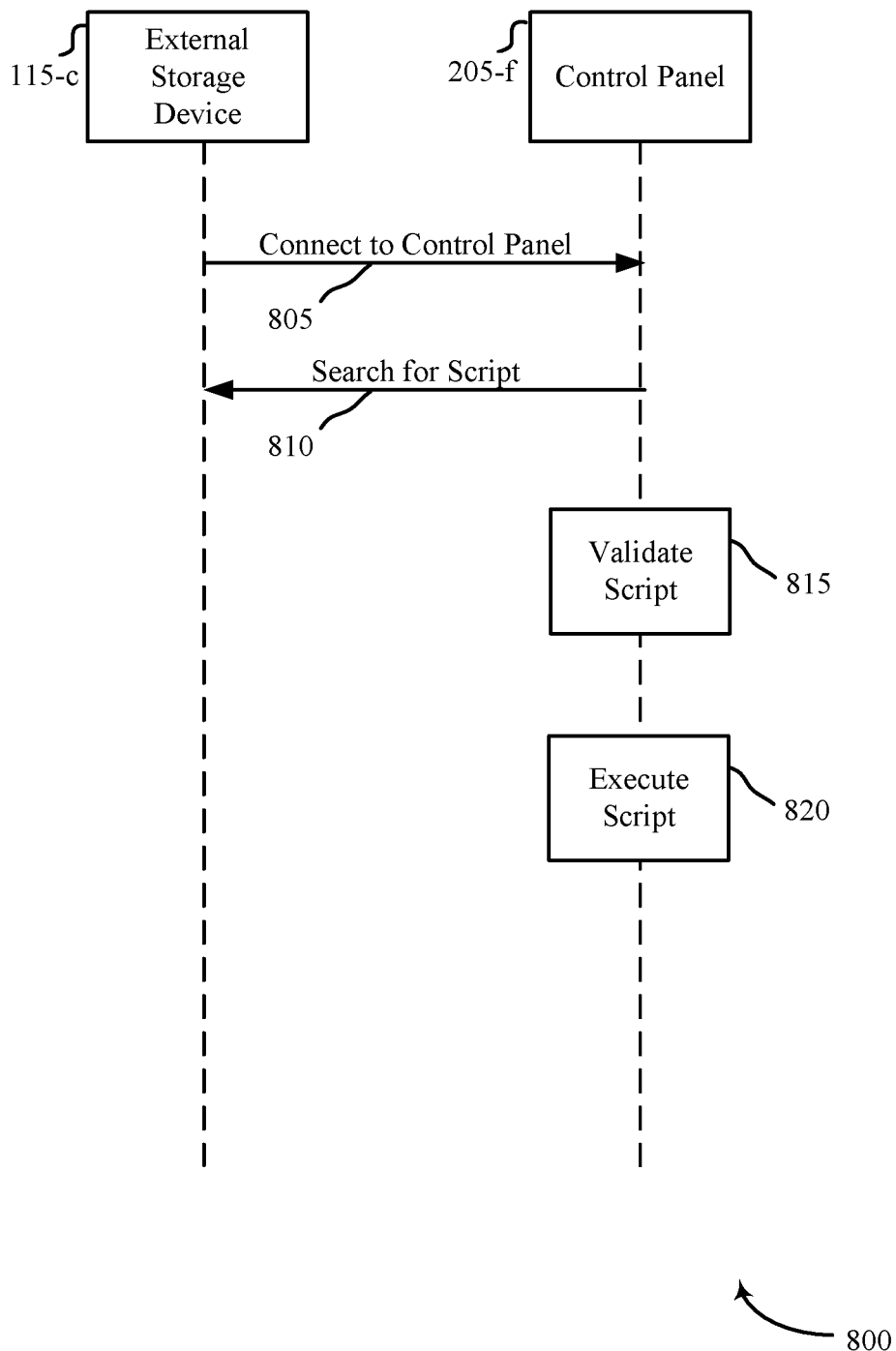
FIG. 8 shows a swim diagram of illustrating a process related to a security and/or an automation system, in accordance with various aspects of this disclosure.

FIG. 8 shows a swim diagram 800 illustrating communications in executing a script for a control panel 205-*f*, in accordance with various examples. The diagram 800 may illustrate one or more external storage devices 115-*c*, which may be an example of the device 115 of FIGS. 1, 4, and/or 7. The diagram 800 may also illustrate a control panel 205-*f* which may an example of control panels 105 and 205 of FIGS. 1, 2, 3, 4, 5, 6, and/or 7.

The device 115-*c* may be an external storage device and may connect 805 to the control panel 205-*f*. The external storage device 115-*c* may complete one or more electrical circuits when it connects to the control panel 205-*f*. The completion of the electrical circuit may trigger the control panel 205-*f* to recognize the external storage device 115-*c*.

The control panel 205-*f* may then search 810 the external storage device 115-*c* for one or more scripts. Once the control panel 205-*f* has identified a script stored on the external storage device 115-*c*, the control panel 205-*f* may validate 815 the script. For example, the control panel 205-*f* may determine the presence of a digital signature embedded or proximate the script. In one embodiments, if the control panel 205-*f* has identified an authentication code or a unique identifier associated with the external device 115-*c*, the authentication code and/or the unique identifier may additionally validate 815 the script. Once the script has been validated 815, the control panel 205-*f* may execute 820 the script. Executing the script 820 may not require any user input. For example, the control panel 205-*f* may automatically execute the script independently and may report results to a user but may not require a user to actually run the script.

In some examples, aspects from two or more of the swim diagrams 700, 800 may be combined and/or separated. For example, the swim diagram 700 may be executed prior to the execution of the swim diagram 800.

Figure 9:
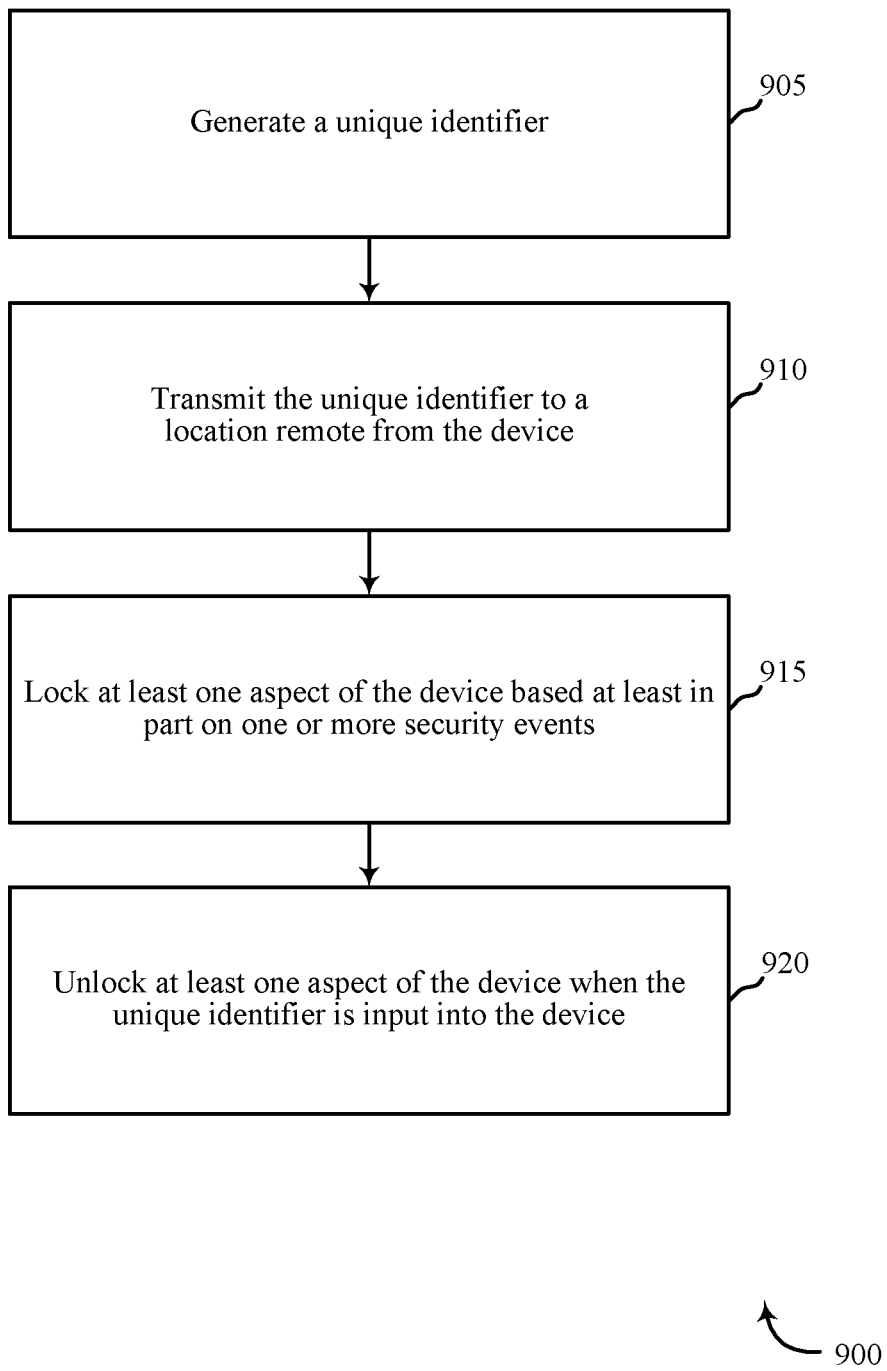
FIG. 9 is a flow chart illustrating an example of a method relating to a security and/or an automation system, in accordance with various aspects of this disclosure.

FIG. 9 is a flow chart illustrating an example of a method 900 for responding to one or more security events at the control panel, in accordance with various aspects of the present disclosure. For clarity, the method 900 is described below with reference to aspects of one or more of the security module 215 described with reference to FIGS. 2, 3, and 6 and/or aspects of one or more of the control panels 105 and 205 described with reference to FIGS. 1-8. In some examples, a control panel may execute one or more sets of codes to control the functional elements of the control panel and/or the security module to perform the functions described below. Additionally or alternatively, a remote device or remote server 145 may perform one or more of the functions described below using special-purpose hardware.

At block 905, the method 900 may include generating a unique identifier. The unique identifier may comprise one of several types of unique identifiers. For example, the unique identifier may be a biometric identifier responding to a person's voice or fingerprint, it may be a randomly generated number of a predetermined length, it may be a series of codes to be input in a specific manner similar to a lock, it may be an alphanumeric number, or the like. If the unique identifier comprises a biometric identifier, the control panel may comprise one or more components to selectively detect and evaluate a biometric identifier. In some embodiments, the unique identifier may be unique to the control panel. For example, each control panel may generate a unique identifier which may be located on a server associated with the control panel. In some embodiments, multiple unique identifiers may be generated and later used to unlock the control panel.

In some embodiments, the unique identifier may be generated when the control panel is first programed. In other embodiments, the unique identifier may additionally or alternatively be generated on a random or predetermined basis. The unique identifier may be regenerated monthly, bi-monthly, bi-annually, annually, or some combination thereof. Providing for random generation of the unique identifier may provide an additional level of security. In some embodiments, regenerating the unique identifier may offer additional security to prevent unauthorized access or tampering with the control panel. In alternative embodiments, a server associated with an automation system provider may generate the unique identifier and transmit the unique identifier to the control panel.

The operation(s) at block 905 may be performed using the identifier module 305 described with reference to FIG. 3.

At block 910, the method 900 may include transmitting the unique identifier to a location remote from the device. In some embodiments, the device may be a control panel. For example, the unique identifier may be used to unlock the control panel should the control panel encounter one or more security events. To use the identifier to unlock the control panel, the identifier must be remote from the control panel to be easily accessible. In an automation system, the control panel may transmit the unique identifier to one or more remote servers (e.g. remote server 145) and/or one or more remote storages (e.g. remote storage 135). The control panel may transmit the information via one or more wired or wireless connections as discussed previously.

The operation(s) at block 910 may be performed using the identifier module 305 described with reference to FIG. 3.

At block 915, the method 900 may include locking the device based at least in part on one or more security parameters. The one or more security events may comprise a default locked status or a takeover locked status. The default locked status may allow a user to use the device but not access any of the code or software or other intellectual property on the device. The takeover locked status may completely lock access to the device in response to any unauthorized attempts to edit one or more pieces of hardware and/or software on the device. For example, a user or other personnel may attempt to reprogram a control panel, the control panel may default and lock down preventing access to the system. In some instances, this may occur when a competitor attempts to overtake the system. It may also occur if a user is attempting to further program the control panel to change an aspect of the automation system. In another instance, a person may gain unauthorized access to the automation system and may attempt to override or otherwise hack into the control panel to gain unauthorized access to at least a portion of the automation system. When the control panel is in locked mode, a user may be unable to access the control panel and/or functions of the automation system.

The operation(s) at block 915 may be performed using the lock module 310 described with reference to FIG. 3.

At block 920, the method 900 may comprise unlocking at least one aspect of the device when the unique identifier is input into the device. If the device is in a default locked status, the method 900 may include completely unlocking all aspects of the device to allow authorized personnel to troubleshoot, update, or otherwise service the device. If the device is a control panel and is in a takeover locked status, to resume use of the automation system, the control panel may require unlocking. Unlocking the control panel to a default locked status may comprise the control panel recognizing one or more unique identifiers on an external device connected to the control panel.

To unlock any aspect of the control panel, the unique identifier, which was transmitted to a remote location in step 910, may be downloaded to an external storage device which may connect to the control panel. When connected, the external storage device may push the unique identifier to the control panel. In another embodiment, the control panel may detect the unique identifier on the external device and the control panel itself may input the unique identifier to unlock the control panel. Once the control panel is unlocked to the desired status, personnel may troubleshoot one or more issues with the control panel. Additionally, unlocking the control panel may enable the user to presume the use of the automation system.

The operation(s) at block 920 may be performed using the unlock module 315 described with reference to FIG. 3.

Thus, the method 900 may provide for a proactive way to react to one or more security events relating to a control panel associated with an automation/security system. It should be noted that the method 900 is just one implementation and that the operations of the method 900 may be rearranged or otherwise modified such that other implementations are possible.

Figure 10:
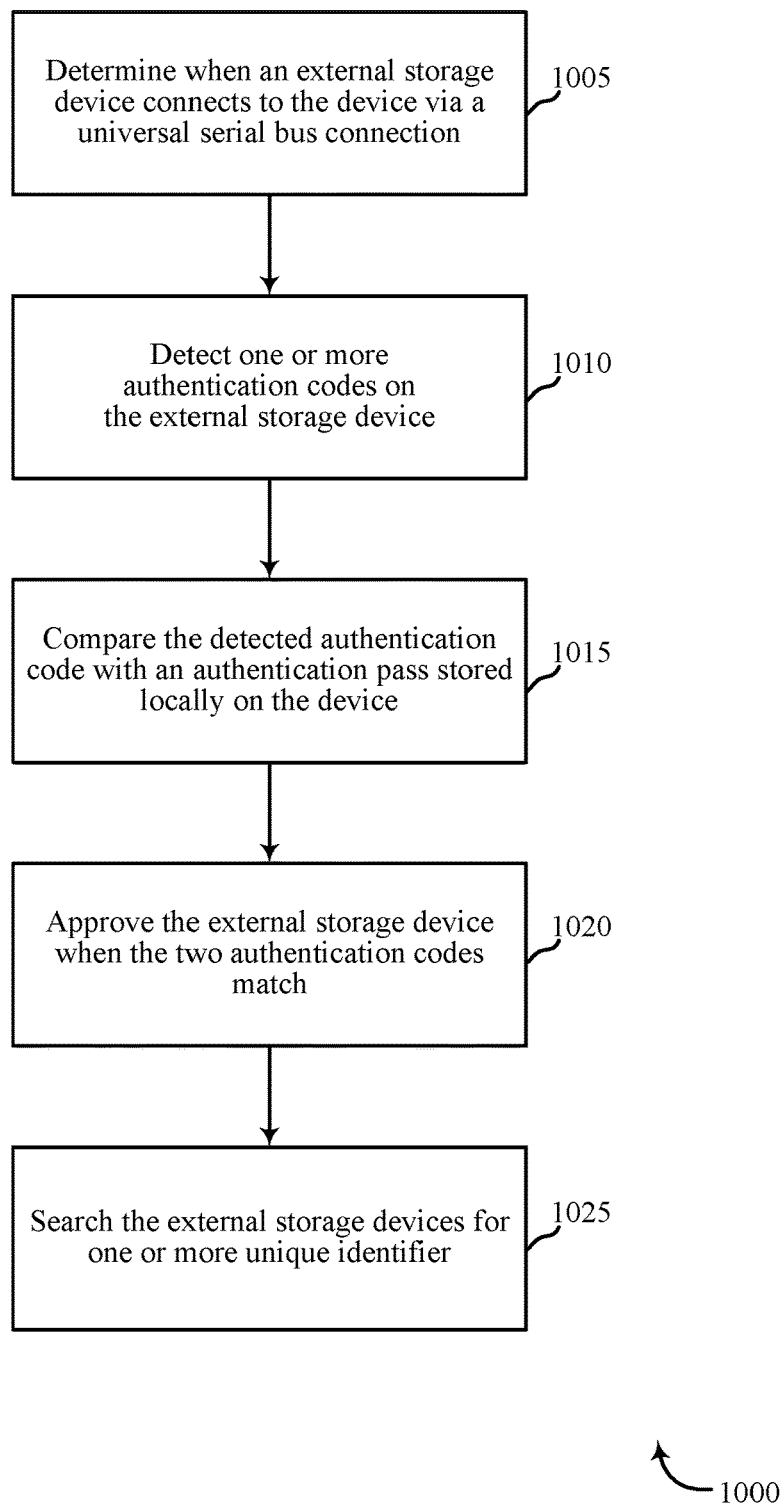
FIG. 10 is a flow chart illustrating an example of a method relating to a security and/or an automation system, in accordance with various aspects of this disclosure.

FIG. 10 is a flow chart illustrating an example of a method 1000 for responding to one or more security events at the control panel, in accordance with various aspects of the present disclosure. For clarity, the method 1000 is described below with reference to aspects of one or more of the security module 215 described with reference to FIGS. 2, 3, and 6 and/or aspects of one or more of the control panels 105 and 205 described with reference to FIGS. 1-8. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 1005, the method 1000 may include determining when an external storage device connects to the device via a universal serial bus (USB) connection. For example, the device may comprise a control panel and the control panel may have one or more female USB drives. When an external storage device comprises a mating male USB drive, plugging the male USB drive into the female counterpart may close one or more electrical circuits. The control panel may recognize when the circuit is closed and detect the presence of the external storage device.

At block 1010, the method 1000 may include detecting one or more authentication identifiers on the external storage device. Once the control panel has detected the connection with the external storage device, the control panel may search the external storage device for one or more authentication codes. The authentication code may be a code generated by an automation system provider and provided to multiple devices associated with the automation system to verify the devices are validated by the automation system provider and not an unauthorized personnel.

At block 1015, the method 1000 may comprise comparing the detected authentication code with an authentication code stored locally on the device. After the control panel has determined the authentication code, the control panel may compare the authentication code to the authentication code stored on the control panel. At block 1020, the method 1000 may include approving the external storage device when the two authentication codes match. Approving the external storage device may comprise allowing the external storage device to access one or more functions of the control panel and vice versa. For example, at bock 1025, the method may include searching the external storage device for one or more unique identifiers. The unique identifiers may comprise one or more unique identifiers generated by the control panel and stored externally from the control panel. The unique identifier may unlock the control panel.

The operation(s) at blocks 1005-1025 may be performed using the unlock module 315 described with reference to FIG. 3.

Thus, the method 1000 may provide for a proactive way to react to one or more security events relating to a control panel associated with an automation/security system. It should be noted that the method 1000 is just one implementation and that the operations of the method 1000 may be rearranged or otherwise modified such that other implementations are possible.

Figure 11:
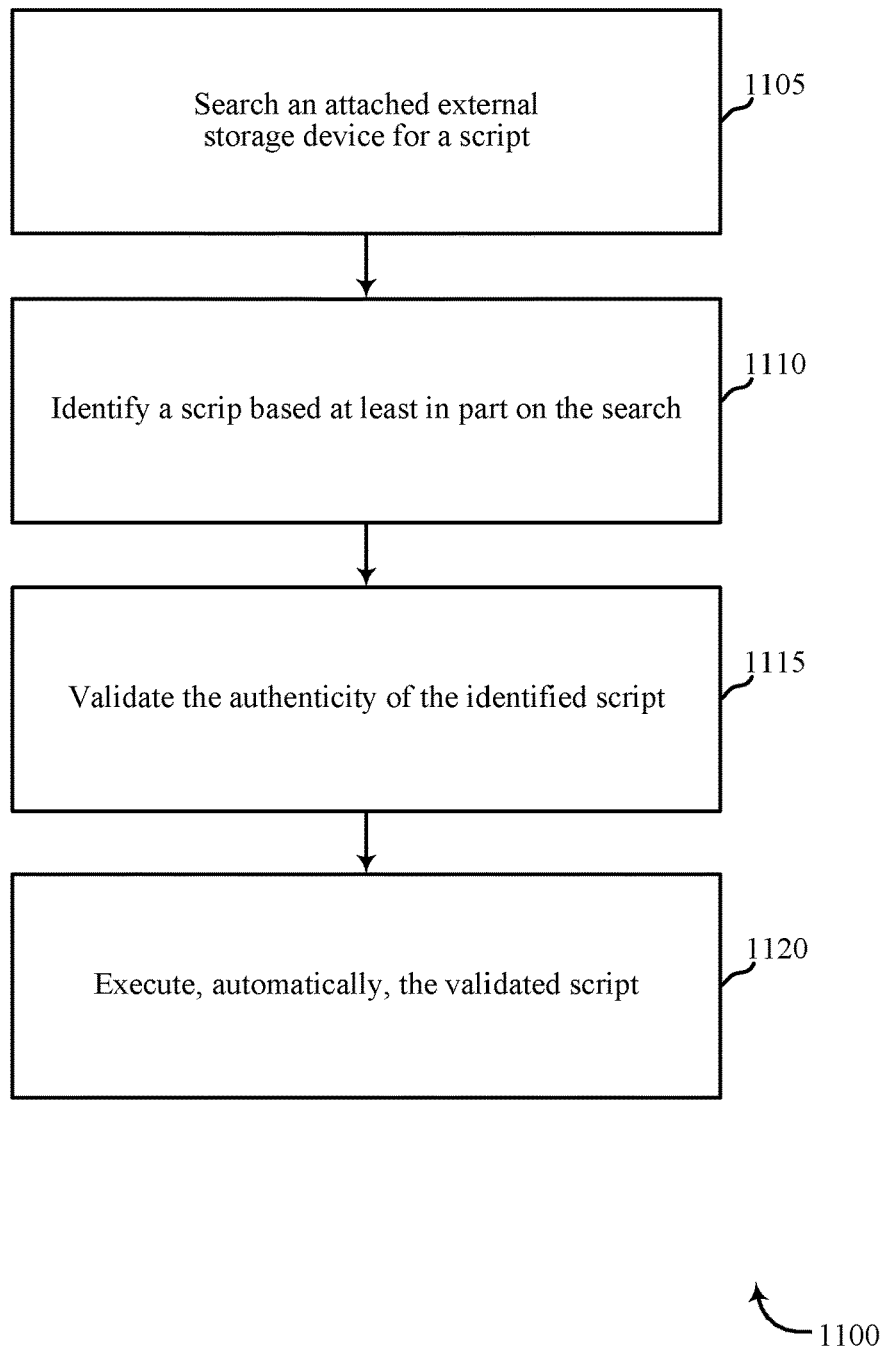
FIG. 11 is a flow chart illustrating an example of a method relating to a security and/or an automation system, in accordance with various aspects of this disclosure.

FIG. 11 is a flow chart illustrating an example of a method 1100 for responding to one or more software events at the control panel, in accordance with various aspects of the present disclosure. For clarity, the method 1100 is described below with reference to aspects of one or more of the script module 405 described with reference to FIGS. 4-6 and/or aspects of one or more of the control panels 105 and 205 described with reference to FIGS. 1-8. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 1105, the method 1100 may include searching an attached external storage device for a script. The external storage device may be connected to the control panel. For example, the external storage device may be connected to the control panel via a wired connection, wireless connection, or a direct USB connection. The control panel may automatically search the external storage device for one or more scripts.

At block 1110, the method 1100 may include identifying a script based at least in part on the searching. The external storage device may comprise multiple scripts. The control panel may need to search the storage device for a particular script uniquely associated with the control panel. For example, the script may have a unique code embedded or otherwise associated with the script file. The external storage device may have a partner unique code or be programmed to only identify code with the unique embedded into the script. The unique code may be a form of a digital signature or may be another authenticating feature of the script file.

The operation(s) at blocks 1105 and 1110 may be performed using the locate module 505 described with reference to FIG. 5.

At block 1115, the method 1100 may include validating the authenticity of the identified script. For example, the script may have one or more authenticating features. The script may comprise one or more validation codes or other authenticating features such as a digital signature embedded in it. In some embodiments, the external storage device may comprise the authenticating feature which may additionally authenticate or serve as authentication for the script.

The operation(s) at blocks 1115 may be performed using the validate module 510 described with reference to FIG. 5.

At block 1120, the method may include executing, automatically, the validated script. For example, after the script has been validated, the script may automatically run on the control panel without any input from personnel, or the like. The script may have several uses. If there is a latent bug or other adverse coding, the script may automatically update and correct the code. The script may also run an update on the entire device. For example, the device may require a new operating system. Debugging the device may allow a service personnel to access the internal workings of the device. It may additionally run debugging lines to test different aspects of the coding and determine where a discrepancy may be located, if at all. Multiple scripts may also be executed. For example, after a first script is run, the results may trigger a second script to additionally run. The process may continue until the control panel reaches a desired state. The second script may be dependent upon one or more results from the first script. In some embodiments, the control panel may communicate results back to the automation system provider which may in turn respond with ancillary scripts to execute. In further embodiments, the external device and the script may not be unique to the particular control panel but may work on multiple control panels associated with the same automation system provider.

The operation(s) at blocks 1120 may be performed using the execute module 515 described with reference to FIG. 5.

Figure 12:
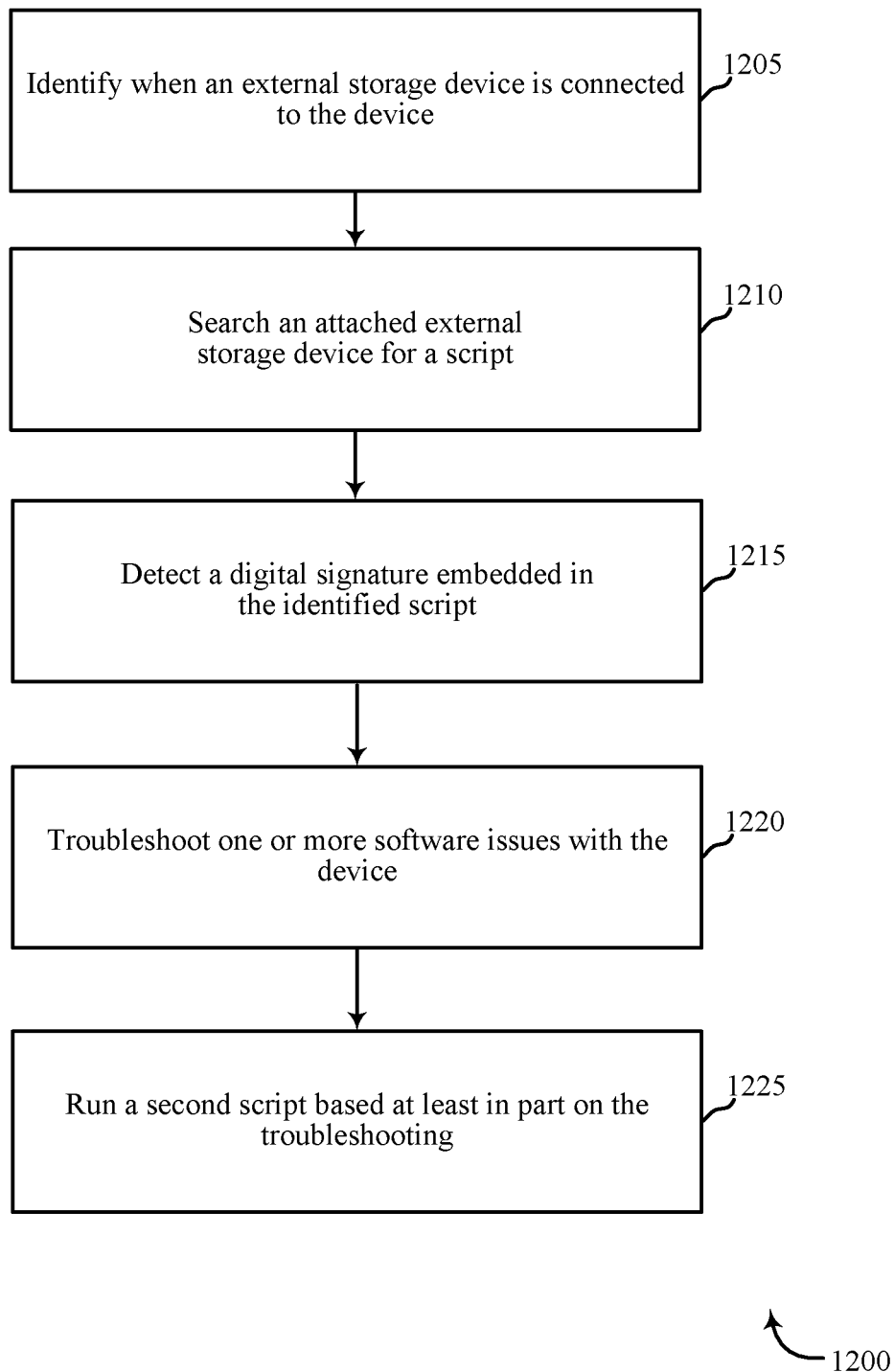
FIG. 12 is a flow chart illustrating an example of a method relating to a security and/or an automation system, in accordance with various aspects of this disclosure.

FIG. 12 is a flow chart illustrating an example of a method 1200 for responding to one or more software events at the control panel, in accordance with various aspects of the present disclosure. For clarity, the method 1200 is described below with reference to aspects of one or more of the script module 405 described with reference to FIGS. 4-6 and/or aspects of one or more of the control panels 105 and 205 described with reference to FIGS. 1-8. In some examples, a control panel may execute one or more sets of codes to control the functional elements of the control panel and/or the security module to perform the functions described below. Additionally or alternatively, a remote device or remote server may perform one or more of the functions described below using special-purpose hardware.

At block 1205, the method 1200 may include identifying when an external storage device is connected to the device. For example, the device may comprise a control panel and the control panel may have one or more ports, such as a digital visual interface, display port, firewire, VGA, HDMI, USB, and the like. When an external storage device comprises a mating male connection, it may plug into the female counterpart to close one or more electrical circuits. The control panel may recognize when the circuit is closed and detect the presence of the external storage device. At block 1210, the method 1200 may include searching the attached external storage device for a script.

The operation(s) at blocks 1205 and 1210 may be performed using the locate module 505 described with reference to FIG. 5.

At block 1215, the method 1200 may detect a digital signature embedded in the identified script. The digital signature may comprise a mathematical scheme for demonstrating the authenticity of a digital message or document. The digital signature may be embedded into the actual script. The digital signature may be specific to an automation system provider wherein the digital signature may be easily recognizable by multiple devices associated with the automation system. In other embodiments, the digital signature may be unique to a specific control panel wherein the control panel may only recognize the specific digital signature and may only execute scripts with the specific digital signature.

The operation(s) at blocks 1215 may be performed using the validate module 510 described with reference to FIG. 5.

At block 1220, the method 1200 may include troubleshooting one or more software issues with the device. For example, after the script is validated, the script may be automatically executing. The script may troubleshoot or attempt to determine why the control panel has failed or is not performing to expectations. The script may logically search the source code at the control panel to locate the potential problem. The script may identify malfunctioning code. Once the script has determined the issue, or potential issues, the script may perform a series of diagnostic tests to ensure the potential issue is in fact causing the control panel to perform below expectations.

At block 1225, the method 1200 may include running a second script based at least in part on the troubleshooting. After the script identifies the potential issues and performs a series of diagnostic tests, the diagnostic results may confirm the initial problem. Returning the control panel back to its fully functioning capabilities may require running a second script to repair the issue. The second script may be a portion of the initial script or may be a completely different script which may require validating, and the like. Once all scripts have completely finished, the control panel may issue an alert or message to an automation system provider of the diagnostic findings and the remedial action taken.

The operation(s) at blocks 1220, 1225 may be performed using the execute module 515 described with reference to FIG. 5.

In some examples, aspects from two or more of the methods 900, 1000, 1100, 1200 may be combined and/or separated. It should be noted that the methods 900, 1000, 1100, 1200 are just example implementations, and that the operations of the methods 900, 1000, 1100, 1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for responding to a security event at a control panel of a security and/or automation system, comprising:
   generating a unique identifier at the control panel;
   transmitting the unique identifier to a device that is remote from the control panel;

locking the control panel based at least in part on an occurrence of the security event;

receiving, at the control panel, the unique identifier based at least in part on locking the control panel; and unlocking at least a portion of the control panel based at least in part on receiving the unique identifier.

2. The method of claim 1, further comprising:

validating the unique identifier based at least in part on receiving the unique identifier, wherein unlocking at least the portion of the control panel is based at least in part on validating the unique identifier.

3. The method of claim 2, wherein validating the unique identifier comprises comparing the received unique identifier with a key stored at the control panel.

4. The method of claim 1, further comprising:

identifying an attempt to access the control panel; and determining whether the attempt to access the control panel is authorized or unauthorized, wherein the security event comprises an unauthorized attempt to access the control panel.

5. The method of claim 1, further comprising:

transmitting, to the device, a request for the unique identifier based at least in part on locking the control panel, wherein receiving the unique identifier is based at least in part on transmitting the request.

6. The method of claim 1, wherein the device that is remote from the control panel comprises an external storage device that is unique to the control panel.

7. The method of claim 1, further comprising:

regenerating the unique identifier on a predetermined basis, wherein at least the portion of the control panel is unlocked using the regenerated unique identifier.

8. The method of claim 7, wherein the unique identifier comprises a biometric identifier, a cryptographic hash, a series of codes, an alphanumeric number, or a combination thereof.

9. An apparatus, comprising:

a control panel of a security and/or automation system comprising a processor, memory in electronic communication with the processor; and instructions stored in the memory, the instructions being executable by the processor to:

generate a unique identifier at the control panel;

transmit the unique identifier to a device that is remote from the control panel;

lock the control panel based at least in part on an occurrence of a security event;

receive, at the control panel, the unique identifier based at least in part on locking the control panel; and unlock at least a portion of the control panel based at least in part on receiving the unique identifier.

10. The apparatus of claim 9, wherein the instructions are further executable by the processor to:

validate the unique identifier based at least in part on receiving the unique identifier, wherein unlocking at least the portion of the control panel is based at least in part on validating the unique identifier.

11. The apparatus of claim 10, wherein validating the unique identifier comprises comparing the received unique identifier with a key stored at the control panel.

12. The apparatus of claim 9, wherein the instructions are further executable by the processor to:

identify an attempt to access the control panel; and determine whether the attempt to access the control panel is authorized or unauthorized, wherein the security event comprises an unauthorized attempt to access the control panel.

13. The apparatus of claim 9, wherein the instructions are further executable by the processor to:

transmit, to the device, a request for the unique identifier based at least in part on locking the control panel, wherein receiving the unique identifier is based at least in part on transmitting the request.

14. The apparatus of claim 9, wherein the device that is remote from the control panel comprises an external storage device that is unique to the control panel.

15. The apparatus of claim 9, wherein the instructions are further executable by the processor to:

regenerate the unique identifier on a predetermined basis, wherein at least the portion of the control panel is unlocked using the regenerated unique identifier.

16. The apparatus of claim 15, wherein the unique identifier comprises a biometric identifier, a cryptographic hash, a series of codes, an alphanumeric number, or a combination thereof.

17. A non-transitory computer-readable medium storing computer-executable code for security and/or automation systems, the code executable by a processor to:

generate a unique identifier at a control panel;

transmit the unique identifier to a device that is remote from the control panel;

lock the control panel based at least in part on an occurrence of a security event;

receive, at the control panel, the unique identifier based at least in part on locking the control panel; and unlock at least a portion of the control panel based at least in part on receiving the unique identifier.

18. The non-transitory computer-readable medium of claim 17, the code further executable by the processor to:

validate the unique identifier based at least in part on receiving the unique identifier, wherein unlocking at least the portion of the control panel is based at least in part on validating the unique identifier.

19. The non-transitory computer-readable medium of claim 18, wherein validating the unique identifier comprises comparing the received unique identifier with a key stored at the control panel.

20. The non-transitory computer-readable medium of claim 17, the code further executable by the processor to:

identify an attempt to access the control panel; and determine whether the attempt to access the control panel is authorized or unauthorized, wherein the security event comprises an unauthorized attempt to access the control panel.

* * * * *